United States Patent
Braskich et al.

(10) Patent No.: US 11,126,525 B2
(45) Date of Patent: *Sep. 21, 2021

(54) IN-HOME LEGACY DEVICE ONBOARDING AND PRIVACY ENHANCED MONITORING

(71) Applicant: ARRIS Enterprises LLC, Suwanee, GA (US)

(72) Inventors: Anthony J. Braskich, Palatine, IL (US); Venugopal Vasudevan, Palatine, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 313 days.

This patent is subject to a terminal disclaimer.

(21) Appl. No.: 16/420,708

(22) Filed: May 23, 2019

(65) Prior Publication Data
US 2020/0371889 A1 Nov. 26, 2020

Related U.S. Application Data

(63) Continuation of application No. 15/260,872, filed on Sep. 9, 2016, now Pat. No. 10,339,958.

(60) Provisional application No. 62/215,839, filed on Sep. 9, 2015, provisional application No. 62/242,272, filed on Oct. 15, 2015.

(51) Int. Cl.
*G06F 11/30* (2006.01)
*G06F 11/34* (2006.01)
*G06N 7/00* (2006.01)
*G10L 25/78* (2013.01)

(52) U.S. Cl.
CPC ...... *G06F 11/3089* (2013.01); *G06F 11/3447* (2013.01); *G06F 11/3452* (2013.01); *G06N 7/005* (2013.01); *G10L 25/78* (2013.01)

(58) Field of Classification Search
CPC ............ G06F 11/3089; G06F 11/3447; G06F 11/3452; G06F 21/6245; G06N 7/005; H04K 3/822; H04K 3/825; H04K 2203/12; H04K 1/00; H04K 1/06; H04K 1/04; H04L 12/2816; H04L 12/282; G05B 15/02; G05B 2219/2642; G10L 25/48; G10L 25/78; G10L 21/06
USPC ...................................... 704/270, 1
See application file for complete search history.

(56) References Cited

U.S. PATENT DOCUMENTS

| 6,829,603 | B1 | 12/2004 | Chai et al. |
| 7,539,656 | B2 | 5/2009 | Fratkina et al. |
| 8,548,811 | B2 * | 10/2013 | Begeja ............ H04W 4/14 704/273 |
| 8,903,073 | B2 * | 12/2014 | Or-Bach ............ G06Q 30/0269 379/218.01 |
| 9,009,053 | B2 * | 4/2015 | Burke ............ G10L 15/26 704/270 |
| 10,657,953 | B2 * | 5/2020 | Park .............. G10L 15/063 |
| 10,762,902 | B2 * | 9/2020 | Garikapati ........ G10L 15/16 |

(Continued)

*Primary Examiner* — Thuykhanh Le
(74) *Attorney, Agent, or Firm* — Wenderoth, Lind & Ponack, L.L.P.

(57) ABSTRACT

Detecting and monitoring legacy devices (such as appliances in a home) using audio sensing is disclosed. Methods and systems are provided for transforming audio data captured by the sensor to afford privacy when speech is overheard by the sensor. Because these transformations may negatively impact the ability to detect/monitor devices, an effective transformation is determined based on both privacy and detectability concerns.

16 Claims, 13 Drawing Sheets

(56) References Cited

U.S. PATENT DOCUMENTS

| | | | |
|---|---|---|---|
| 10,789,041 B2* | 9/2020 | Kim | G10L 15/20 |
| 2002/0107716 A1 | 8/2002 | Callahan et al. | |
| 2008/0103781 A1* | 5/2008 | Wasson | G10L 17/26 |
| | | | 704/277 |
| 2008/0168223 A1* | 7/2008 | Reeves | G06F 1/3268 |
| | | | 711/114 |
| 2010/0079597 A1* | 4/2010 | Stokes | H04N 21/4425 |
| | | | 348/184 |
| 2012/0183172 A1* | 7/2012 | Stroila | G06K 9/228 |
| | | | 382/100 |
| 2013/0144622 A1* | 6/2013 | Yamada | G10L 25/00 |
| | | | 704/248 |
| 2013/0187953 A1* | 7/2013 | Matsumura | G06T 19/00 |
| | | | 345/633 |
| 2013/0339028 A1 | 12/2013 | Rosner et al. | |
| 2014/0153775 A1 | 6/2014 | Maruyama et al. | |
| 2014/0193157 A1* | 7/2014 | Du | G08C 23/04 |
| | | | 398/106 |
| 2014/0195064 A1* | 7/2014 | Lim | H04L 12/2827 |
| | | | 700/298 |
| 2014/0240106 A1* | 8/2014 | Kodama | G08B 1/08 |
| | | | 340/286.07 |
| 2014/0281911 A1* | 9/2014 | Kim | G06F 16/957 |
| | | | 715/234 |
| 2014/0330560 A1* | 11/2014 | Venkatesha | G10L 15/26 |
| | | | 704/235 |
| 2015/0067080 A1* | 3/2015 | Cho | H04L 67/025 |
| | | | 709/206 |
| 2015/0140990 A1* | 5/2015 | Kim | H04W 8/186 |
| | | | 455/418 |
| 2015/0154976 A1* | 6/2015 | Mutagi | H04L 12/281 |
| | | | 704/275 |
| 2015/0191175 A1* | 7/2015 | Zhang | B60W 40/10 |
| | | | 701/36 |
| 2015/0287414 A1* | 10/2015 | Tsujikawa | G10L 15/20 |
| | | | 704/275 |
| 2016/0027436 A1* | 1/2016 | Lee | G10L 15/08 |
| | | | 704/236 |
| 2016/0075034 A1* | 3/2016 | Laurent | G05B 15/02 |
| | | | 700/264 |
| 2016/0077794 A1* | 3/2016 | Kim | G06F 3/167 |
| | | | 704/275 |
| 2016/0155443 A1* | 6/2016 | Khan | G06F 1/3203 |
| | | | 704/275 |
| 2017/0039007 A1* | 2/2017 | Nathani | G06F 3/1238 |
| 2017/0176967 A1* | 6/2017 | Takada | G06Q 10/00 |

* cited by examiner

```
Function frameOrder = shuffleAudio(inFileName, outFileName, frameMillis, window)
%SHUFFLEAUDIO Shuffle frames of audio for obfuscation
% frameOrder  = SHUFFLEAUDIO(inFileName, frameMillis, window) shuffles
% the audio read from inFileName and writes a new WAV file to outFileName.
% frameMillis is integer specifying duration of frame in milliseconds.
% window is integer specifying number of frames in a window.
% Shuffling is done by permuting frames within non-overlapping windows.
% frameOrder holds the frame permutation
[y, Fs, Nbits] = wavread(inFileName);
fprintf('Read wav file, samples: %d\n', size(y,1));
sampPerFrame = Fs * frameMillis / 1000;
% ignore fractional frames at the end
frameCount = fix(size(y,1) / sampPerFrame);
fprintf('Frame count %d , samp/Frame = %d\n', frameCount, sampPerFrame);
% last window may be partial;; not included in this count.
fullWinCount = fix(frameCount / window);
frameOrder = 1:frameCount;
for win = 1:fullWinCount
        frmlist = ((win-1)*window + 1):(win*window);
        shuflist = frmlist(randperm(window));
        frameOrder(frmlist) = shuflist;
end
% the permuted frame order is in frameOrder
% output sample vector is 'audio'
audio = y;
for fx = 1:frameCount
        fnum = frameOrder(fx);
        outsamps = ((fx-1)*sampPerFrame + 1):(fx*sampPerFrame);
        insamps = ((fnum-1)*sampPerFrame + 1):(fnum*sampPerFrame);
        audio(outsamps) = y(insamps);
end
wavwrite(audio, Fs, Nbits, outFileName);
```

*FIG. 7*

```
import sys
import time
import ConfigParser
import os.path
import subprocess
from parseCreateLibSVMDataset import FeatVec class AudioSensorFullProcessing(object):
        def __init__(self, configFile):
                self.config = ConfigParser.SafeConfigParser()
                self.config.read(configFile)

# initializations
                sys.path.append(self.config.get('svm','svmhome') + "/python")
                import svmutil
                self.svm = svmutil
                self.scalecmd = [self.config.get('svm', 'scale')]
                self.scalecmd.append('-r')
                self.scalecmd.append(self.config.get('svm', 'scaledata'))
                self.model = self.svm.svm_load_model(self.config.get('svm', 'model'))

self.processLoop()

def processLoop(self):
                # recorder command
                recordCmd = [self.config.get('maf', 'record')]
                recordCmd.extend( self.config.get('maf', 'record_opt').split() )
                recordCmd.extend( ["-d", self.config.get('maf', 'duration')] )

# maf A Command
                mafaCmd = [self.config.get('maf', 'mafa')]
                mafaCmd.extend( self.config.get('maf', 'mafa_opt').split() )

# post processing holders
                ppFile = None
                ppTime = None
```

FIG. 8A

```
            while True:
                    mafTime = time.gmtime()
                    mafOutputName = time.strftime("%Y%m%d-%H%M%sz", mafTime) +
                    "-MAF-A.txt"
                    recordp = subprocess.Popen(recordCmd, stdout=subprocess.PIPE)
                    mafp = subprocess.Popen(mafaCmd, stdin=recordp.stdout,
stdout=open(mafOutputName, 'w'))
                    print "Recording pid={0} & maf-a pid={1}".format(recordp.pid, mafp.pid)

print "Waiting for audio to complete"
                    if mafp.wait():
                            print "ERROR: got error code for maf processing on exit"
                    if recordp.wait():
                            print "ERROR: got error code for audio recording on exit"
                    self.postProcess(mafOutputName, mafTime)

def postProcess(self, mafFile, startTime):
            svmfile  = mafFile + ".libsvm"
            st = time.time()
            FeatVec(mafFile, svmfile)
            print " FeatVec done", time.time() – st
            scalefile = svmfile + ".scale"

# scale
            ret = subprocess.call(self.scalecmd + [svmfile], stdout=open(scalefile, 'w'))
            if ret:
                    print "ERROR: Scale data failed", ret
            print " Scale done", time.time() – st predict
            y, x = self.svm.svm_read_problem(scalefile)
            p_label, p_acc, p_val = self.svm.svm_predict(y, x, self.model)
            print "Prediction: percent non idle class", p_acc[0], "done", time.tiime() – st if __name__=='__main__':
        if len(sys.argv) < 2:
                print "Usage: {0} CONFIG_FILE".format(sys.argv[0])
                raise SystemExit(1)
        audSensor = AudioSensor(sys.argv[1])
```

*FIG. 8B*

```
var fs = require('fs');
var dbDao;
var lastTime = 0;
var featureSpacing = 0.1;
var state = 0;
var timeInState = 0;
var stateName = ["idle", "grind", "rest", "brew"];
var bufferTimeLen = 20.5;
var buffer = [];
for (i=0; I < bufferTimeLen / featureSpacing; i++) {
        buffer.push('0');
} function processParamsAndFile(params, fname) {
        var startTime = parseFloat(params['time']);
        var duration = parseFloat(params['duration']);
        var endTime = startTime + duration;
        if (lastTime > 0) {
                var gap = startTime – lastTime;
                console.log("Gap since previous observations", gap);
                for (var j=0; j < gap / featureSpacing; j++) {
                        processSamp('?');
                }
        }
        lastTime = startTime;
        var array = fs.readFileSync(fname).toString().split("\n");
        for (i=0; I < array.length; i++) {
                processSamp(array[i]);
        }
        // pull time ahead
        if (lastTime < endTime) {
                var diff = endTime – lastTime;
                timeInState += diff;
                lastTime = endTime;
        }
        logCurrentState();
}
```

*FIG. 9A*

```
function bufferHas(time, observation, ratio) {
        if (time > bufferTimeLen) {
                console.log("Buffer size not sufficient!");
        }
        var samps = time / featureSpacing;
        // slice of array that is this length, at end.
        var arrslice = buffer.slice(-samps);

var count = 0;
        for (var i=0; I < arrslice.length; i++) {
                if (arrslice[i] == observation)
                        count++
                else if (arrslice[i] == '?')
                        count +; 0.5;
        }
        return (count > arrslice.length * ratio);
} function processSamp(samp) {
        buffer.shift(); // throw away oldest data
        buffer.push(samp); // add newest data to end of array
        lastTime += featureSpacing;

// state machine
        var newstate = state;
        switch(state) {
        case 0: // idle
                // 75% confidence of 6 seconds of grind phase
                if (bufferHas(6, '1', 0.75))
                        newstate = 1;
                break;
        case 1: // grind
                // 50% confidence of 1 second of grind phase – tail end of prior transition
                if (bufferHas(1, '1', 0.5)) {
                        break;
                }
                // 60^ confidence of 13 seconds of idle phase
                if (bufferHas(13, '0', 0.6)) {
                        newstate = 2;
                        break;
                }
```

*FIG. 9B*

```
            if (timeInState > 17.0) {
                    logEvent("Too much time in grind state, did not exit to rest state.");
                    newstate = 0;
            }
            break;
    case 2: // rest
            // 50% confidence 1 second of idle phase – tail end prior transition
            if (bufferHas(1, '0', 0.5)) {
                    break;
            }
            // 60% confidence of 10 seconds of brew phase
            if (bufferHas(10, '2', 0.6)) {
                    newstate = 3;
                    logEvent("Brewed coffee");
                    break;
            }
            if (timeInState > 25.0) {
                    logEvent("Too much time in rest state, did not exit to brew state.");
                    newstate = 0;
            }
            break;
    case 3: // brew
            // 55% confidence of 2 second of brew phase – continued prior transition
            if (bufferHas(2, '2', 0.55)) {
                    break;
            }
            // 70% confidence of 20 seconds of idle phase – back to idle
            if (bufferHas(20, '0', 0.7)) {
                    newstate = 0;
                    break;
            }
            if (timeInState > 80.0) {
                    logEvent("Too much time in brew state, exiting to idle state.");
                    newstate = 0;
            }
            break;
```

*FIG. 9C*

```
        default:
            console.log("ERROR unknown state" + state);
    }
    if (newstate != state) {
        logStateChange(state, newstate, timeInState);
        timeInState = 0.0;
        state = newstate;
    } else {
        timeInState += featureSpacing;
    }
} function logStateChange(oldState, newState, timeSpent) {
    console.log("Transition state " + stateName[oldState] + " to " + stateName[newState] +
        " after time " + timeSpent, "clock:", lastTime);
    doc = {'device': deviceName, 'priorState': stateName[oldState], 'state': statename[newState],
        'timeInState': timeSpent, 'time': lastTime*1000};
    dbDao.stateChange(doc);
} function logEvent(event) {
    console.log("***Event:", event, "clock:", lastTime);
    doc = {'device': deviceName, 'event': event, 'time': lastTime*1000};
    dbDao.events(doc);
} function logCurrentState() {
    console.log("Current state:", stateName[state], "for time", timeInState, "clock:", lastTime);
    doc = {'device': deviceName, 'state': stateName[state], 'timeInState': timeInState,
        'time': lastTime*1000};
    dbDao.stateLog(doc);
}
```

FIG. 9D

IN-HOME LEGACY DEVICE ONBOARDING AND PRIVACY ENHANCED MONITORING

This application is a continuation of U.S. application Ser. No. 15/260,872. U.S. application Ser. No. 15/260,872 claims priority from earlier filed U.S. Provisional Application Ser. No. 62/215,839, filed Sep. 9, 2015 and U.S. Provisional Application Ser. No. 62/242,272 filed Oct. 15, 2015, both of which are hereby incorporated by reference.

TECHNICAL FIELD

The present disclosure relates to the field of device monitoring, and more particularly, to systems and methods for identifying or recognizing legacy devices as well as to systems and methods for speech obfuscation by audio sensors used in device monitoring.

BACKGROUND

Smart home technologies provide a benefit to consumers through monitoring (and possibly actuation) of devices in the home. While new devices may be "smart," there are many legacy home devices that will remain within a "smart" home and will be replaced only over a potentially long timeframe.

The conventional ecosystem of home appliances includes an extremely large "sunk cost" in legacy appliances (e.g., washing machines, sump pumps). Legacy home appliances, which are typically not readily retrofittable with Internet of Things ("IoT") capabilities, may use sounds and visual indicators to notify humans upon changes of state.

SUMMARY

The present disclosure describes methods and systems related to onboarding legacy devices into an in-home monitoring environment. In one example, a method includes obtaining a first user input identifying a device, collecting one or more feature data sets related to the device from at least one ambient sensor, and identifying a set of device models based on the first user input and the one or more feature data sets. The set of device models includes, for example, at least one device model that represents the device. The method further includes requesting a second user input based on the set of device models. Furthermore, the method involves retrieving information about the device based on the second user input and presenting the retrieved information to the user.

BRIEF DESCRIPTION OF THE DRAWINGS

Further details of the example implementations are explained with the help of the attached drawings in which:

FIG. 7 depicts an illustrative example of MATLAB code that may be used to perform temporal shuffling of a captured audio sample.

FIGS. 8A and 8B depict an illustrative example of Python code that may be used to capture an audio sample and identify a device based on analysis of the captured audio.

FIGS. 9A-9D depict an illustrative example of Javascript code that may be used to detect operation of a device in a system such as the system of FIG. 2.

DETAILED DESCRIPTION

Figure 1:
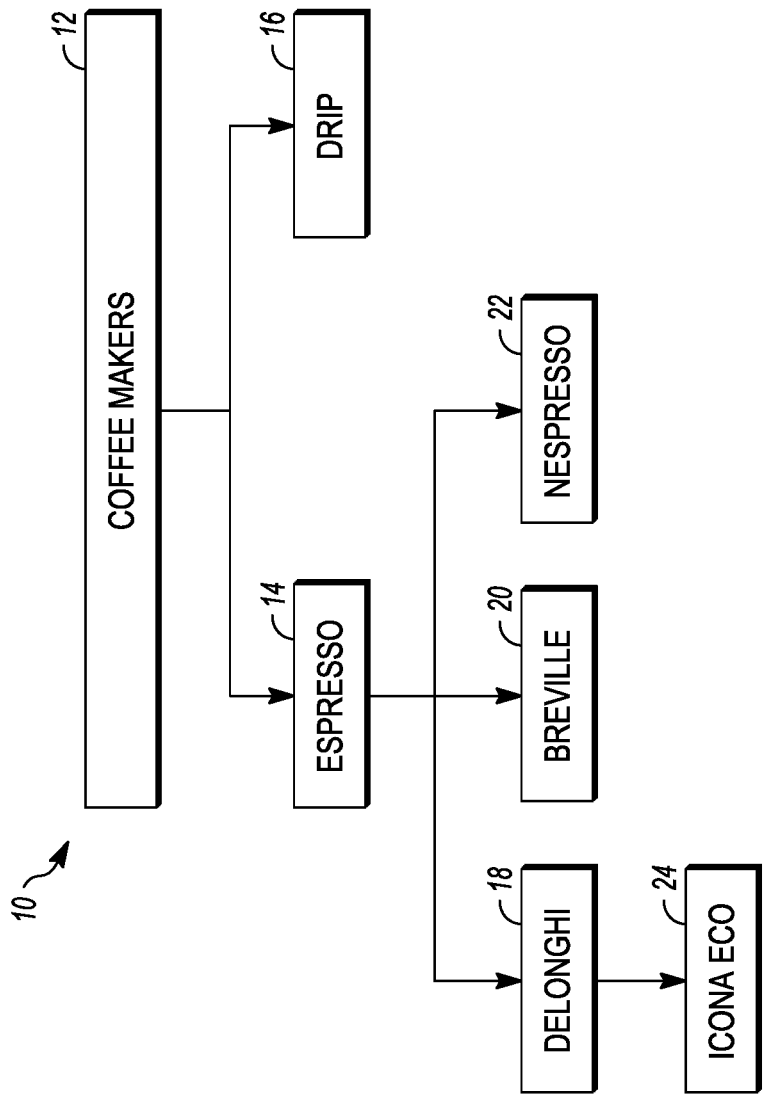
FIG. 1 depicts an illustrative example of a hierarchy data model that may be used for an example scenario.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Recent advances in audio, e.g., far-field audio, hold promise as a means of retroactively "smartening" devices such as legacy home appliances by detecting and classifying audio signatures of the devices to determine their operational state. However, the presence of audio sensors within the home may present privacy concerns for consumers. In particular, while the sensor is continually listening for device sounds, it will also overhear people in the home. Consumers may be especially sensitive to speech being received by the sensor. Thus, there is a need for an audio sensing/observing method where speech cannot be understood but device operation remains detectable.

In one aspect of the disclosure, detecting and monitoring legacy devices (such as appliances in a home) using audio sensing is disclosed. Embodiments of methods and systems are provided for transforming the audio to afford privacy when speech is overheard by the sensor. Because these transformations may negatively impact the ability to detect and/or monitor devices, a transformation is determined based on both privacy and detectability concerns. Although the system is described as using ambient audio sensors to detect and/or monitor the legacy devices, it is contemplated that other types of sensors may be used, including, for example, light sensors and temperature sensors. For example, a simple photodetector or low-resolution camera may be used to detect and/or monitor a lamp or a video display.

Further aspects of the disclosure provide techniques for determining the parameters to create an effective obfuscation transformation and subsequently applying the obfuscation transformation to an audio sensing device. In an illustrative embodiment, an audio sensor can be trained to determine the states of operation of an observed device. In this example, a transformation, selected from a variety of transformations, is applied to a captured sample of audio. The transformation involves one of temporal shuffling, a spectral transformation or a combination of temporal shuffling and spectral transformation. Temporal shuffling, for example, divides the audio signal into a series of equal-duration audio frames and reorders the frames. Spectral transformation includes, for example, application of a time-domain to frequency domain transformation, a band-stop or band-pass filter. Each transformation may have one or more parameters such as the duration of a frame or the characteristics of a filter. The provided method determines an effective obfuscation transformation for audio. Here, effective means both: causing a specified fraction of speech within the audio to be unintelligible; and limiting the degradation in detecting device operation to a specified amount.

I. Onboarding of Legacy Devices

Conventional technologies to install sensors for monitoring legacy devices may require a complex data-entry setup process, relegating these systems to a niche market of home automation hobbyists. A lack of an easy-to-use, intuitive onboarding process (i.e., identification of a particular device for monitoring by an audio sensor), in conventional solutions, can be a significant barrier to smart home adoption.

In an embodiment, onboarding of legacy devices may be achieved through a multi-phase user interaction backed by a hierarchical data structure. In the first phase, a user is presented with a one or two step process to identify devices. For example: clicking to choose a device category (e.g. coffee maker); taking a photo of the device; speaking the type and/or brand of the device; and/or recording audio of the device while it operates. Subsequently, the system tracks at least basic on/off usage of the device. For example, while monitoring the device, the system may attempt to match detected features with previously stored features, and if matches occur, the metadata for the monitored device may be augmented. For certain devices, the system can ask the user additional questions about the device (2nd phase). The questions asked to the user are determined by the hierarchical data model and the features sensed so far. (Detailed specification of the device permits model-specific information (e.g., maintenance videos), more detailed usage reporting, etc.).

More specifically, aspects of the present disclosure provide a multi-phase onboarding process that is driven by a hierarchical data model. A hierarchical model allows for varying levels of detail for different types of devices. For some devices (table lamp), generic representation is sufficient. For heavily used and/or other more complex devices specific representation may be desirable. The first phase of user interaction allows a device being monitored to be roughly identified within the data model (e.g., a broad identification as a coffee maker). Subsequently, observations of the device can begin.

Combined with observations of the device being monitored, the data model triggers the second phase of user interaction. In particular, if the data model can offer the user more operational and/or maintenance information about the device by going deeper into the hierarchy of the data model (e.g., more specifically defining the monitored device), then the system may ask for more information useful in more specifically identifying the monitored device. Further, additional questions may be asked of a user when sensed features are insufficient for the system to confidently identify the device.

The system adds information to nodes in the data model as it operates in order to improve future performance. In particular, multimedia content collected through user interactions, such as photographs, plus sensed data, such as audio features, provide an opportunity for online learning. After the second phase of interaction, the collected multimedia data now contributes to the hierarchical model as labeled examples, and can update information at several levels of the hierarchy. A benefit of this online learning is that, after time, the system can reduce the amount of information requested from the user in second phase interactions.

The present disclosure describes a system for identifying a device of interest in the home for the purpose of monitoring usage. The example system obtains a first user input describing or identifying the device of interest. It then collects one or more feature data sets through sensing and/or observation of the device in operation and identifying a frequency of use (e.g., recording audio and analyzing recorded audio to identify stages of operation). The system then determines, based on the first user input, feature data, and frequency of use, whether additional information is needed to distinguish among a set of device models that may represent the device of interest. For example, if additional operational and/or maintenance information is available for a specific device as opposed to a broad category of devices, the system may determine that a more specific device identification is desirable. Next, the system requests information in a second user input, where the requested information is based on the set of device models. Once a more specific device identification is made, the system may present detailed information to the user about the device of interest based on the second user input.

An audio sensor may be used to detect appliance usage. The audio sensor may operate, for example, using a modified version of a Media Analysis Framework, which analyzes audio to generate representative feature data. Detection compares the feature data against a statistical model trained using machine learning. In particular, models trained using support vector machine libraries are used to represent stages of operation of the device being monitored.

A hierarchical model allows for varying levels of detail for different types of devices. For example, generic representation may be sufficient for some devices (e.g., simple devices such as a table lamp), whereas more specific representation may be useful for heavily used or complex devices. The data model composition may include a hierarchical structure (e.g., 'appliance'→'coffee maker'→'espresso machine') and one or more nodes may include metadata (e.g., manufacturer/model) and/or sensed data (audio).

In one implementation, the system may add information to parent/child nodes as it operates to improve future performance.

In embodiments, the data model may build on existing ontologies for describing devices. For example, web ontology language (OWL) may be used as an ontology language. The ontology may be extended to include sensing or other multimedia data. It should be understood that existing tools may be used to implement the data model (e.g., resource description framework (RDF), Triplestore databases, etc.).

In some embodiments, information may be gathered through bootstrapping with other appliance data. For example, device data may be retrieved from energy regulators which store data for certain appliances, and this information may include specific model information.

The following example shows an onboarding process according to the methods and systems described herein. FIG. 1 shows an example hierarchy data model 10 that may be used for this example scenario. In this example, a user has a new espresso maker and also has access to an existing, adaptable audio sensor. The user can take or use existing photos of a coffee maker to indicate that the audio sensor is within "earshot" of the coffee maker. The system may use the photo to identify a node in the hierarchical data model 10 under which the device is likely to fall. For example, the photo may allow the system to determine, based on the appearance of the new espresso maker, that the device is a coffee maker 12 and falls into the 'espresso' category 14 as opposed to the 'drip' category 16. For example, the photo may be submitted to one of various image databases, such as ImageNet, which will compare, in an automated fashion, the photo to existing labeled images in order to identify a specific device type or device category of the subject device.

In embodiments, an audio sensor may monitor the new espresso maker in use. For example, the audio sensor may track and report basic on/off usage to the user and may build an averaged feature model that can be stored by the system to represent the new device.

After collecting several sets of audio samples, the system may use the audio samples to determine the type of espresso device. For example, based on the audio samples, the system may determine that the espresso device is either a 'DeLonghi®' espresso machine 18 or a 'Nespress®®' espresso machine 22 while also determining that the espresso device is not a 'Breville®' espresso machine 20.

The system may determine the frequency at which the user uses the new espresso machine and may determine that specific content may be available if the system is able to descend deeper into the hierarchy. For example, the user may be prompted by the system with questions as to the specific model information of the espresso machine (e.g., the user may respond to the prompt 'Choose your device brand:' with 'DeLonghi Icona®' 24). Subsequent to the input of this additional information, the system can access on-line material concerning the device to provide more specific operational and/or maintenance information to the user. For example, the system can track number of uses of the device and can recommend a maintenance procedure after a certain number of uses as specified by the device manufacturer. The system may provide device specific content (e.g., use/maintenance videos).

In embodiments, multimedia content may be collected prior to a device being fully identified. The first user interaction step may involve taking a picture of the device, and audio recordings may be taken between the user interaction steps (and possibly in the first step). Subsequent refined identification of the device provides an online learning opportunity for the system. For example, after the second user interaction, the collected multimedia may be a labeled training example. Multimedia may be used to train at multiple levels of the hierarchy (e.g., the photo is of a coffee machine→espresso→DeLonghi→Icona ECO). When sufficient examples exist for a node in the hierarchy, the model for that node can be retrained. The model for a leaf node and its parent nodes can be updated. As the system learns, user interaction to identify the device may be shortened/reduced. For example, a system with multiple data examples may permit a subsequent user interaction to be reduced to only a confirmation question (e.g., 'Is your device an Icona ECO 310?').

Figure 2:
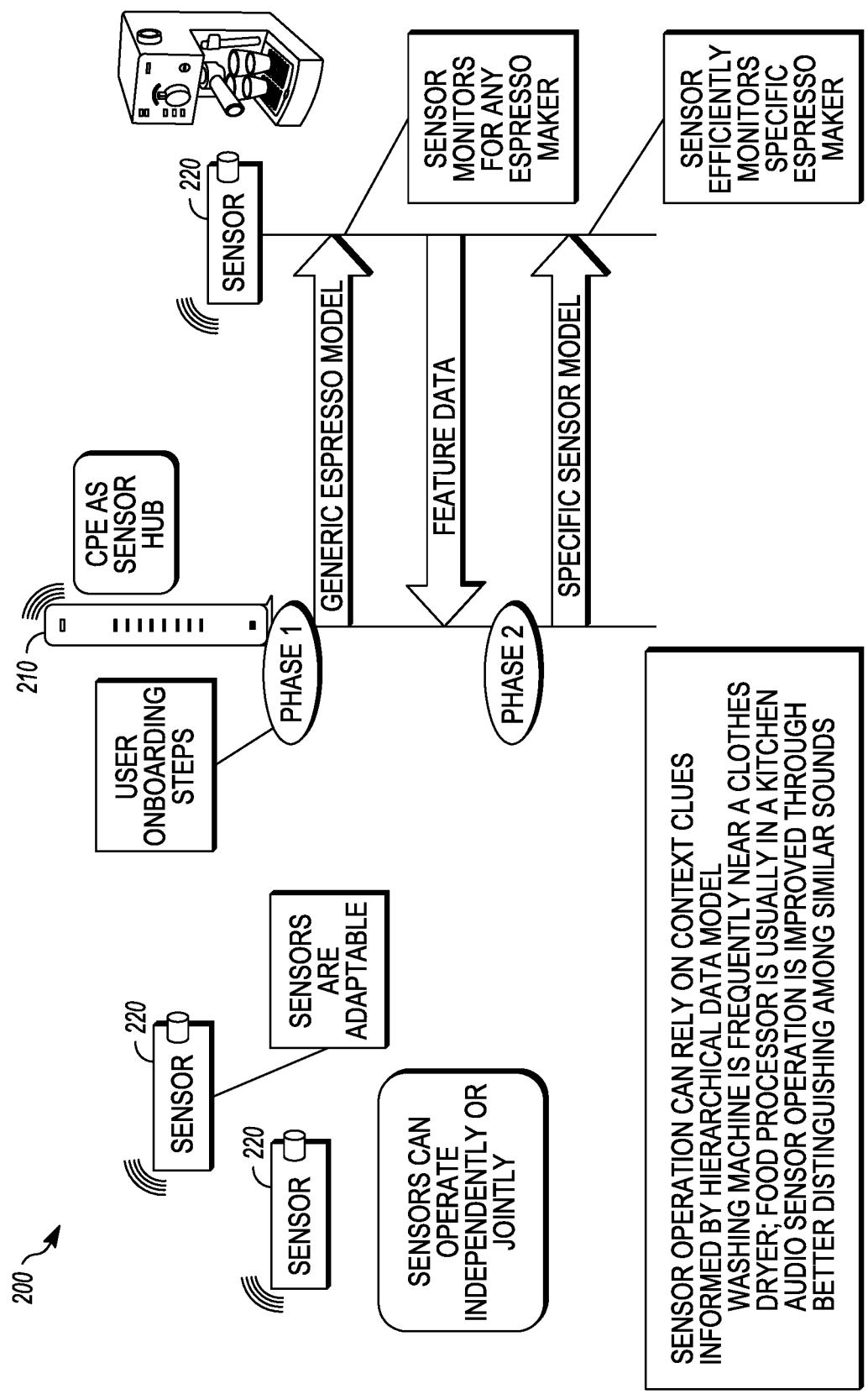
FIG. 2 depicts an illustrative example of a system that may be used to generate a hierarchical model and to identify devices within a home according to data within the hierarchical model.

FIG. 2 shows an example of a system 200 that may be used to generate a hierarchical model and to identify devices within a home according to data within the hierarchical model. In embodiments, a customer premise equipment (CPE) 210 (e.g., gateway device, router, etc.) may be used as a sensor hub, and one or more sensors 220 (e.g., audio sensor) may provide the sensor hub with gathered information associated with a device. Moreover, sensor operation may rely on context clues retrieved from the hierarchical data model (e.g., typical relative proximity between a subject device and another device).

The home monitoring solution shown in FIG. 2 may be created using a central hub (e.g., within CPE device) plus one or more distributed sensors. The sensors 220 may operate individually or can collectively perform distributed sensing (e.g., forming a microphone array). Sensors may be adaptable and may be provisioned to sense (listen for) different feature patterns. After the first phase, a sensor 220 can monitor based on generic feature model (e.g., for all espresso makers). The sensor 220 can send feature data to the hub, allowing the system 200 to refine the model of the device. After phase two, the system 200 can provision the sensor(s) 220 with refined feature models specific to the device. The sensor 220 may then listen for and report device operation states (e.g., idle, grind, and brew states of an espresso maker, etc.).

In embodiments, sensor 220 operation may rely on context clues informed by the hierarchical data model. Context clues may include information such as relative device proximity (e.g., washing machine is frequently near a clothes dryer, food processor is usually in a kitchen, etc.). Audio sensor operation may be improved through a better distinguishing among similar sounds.

Figure 3:
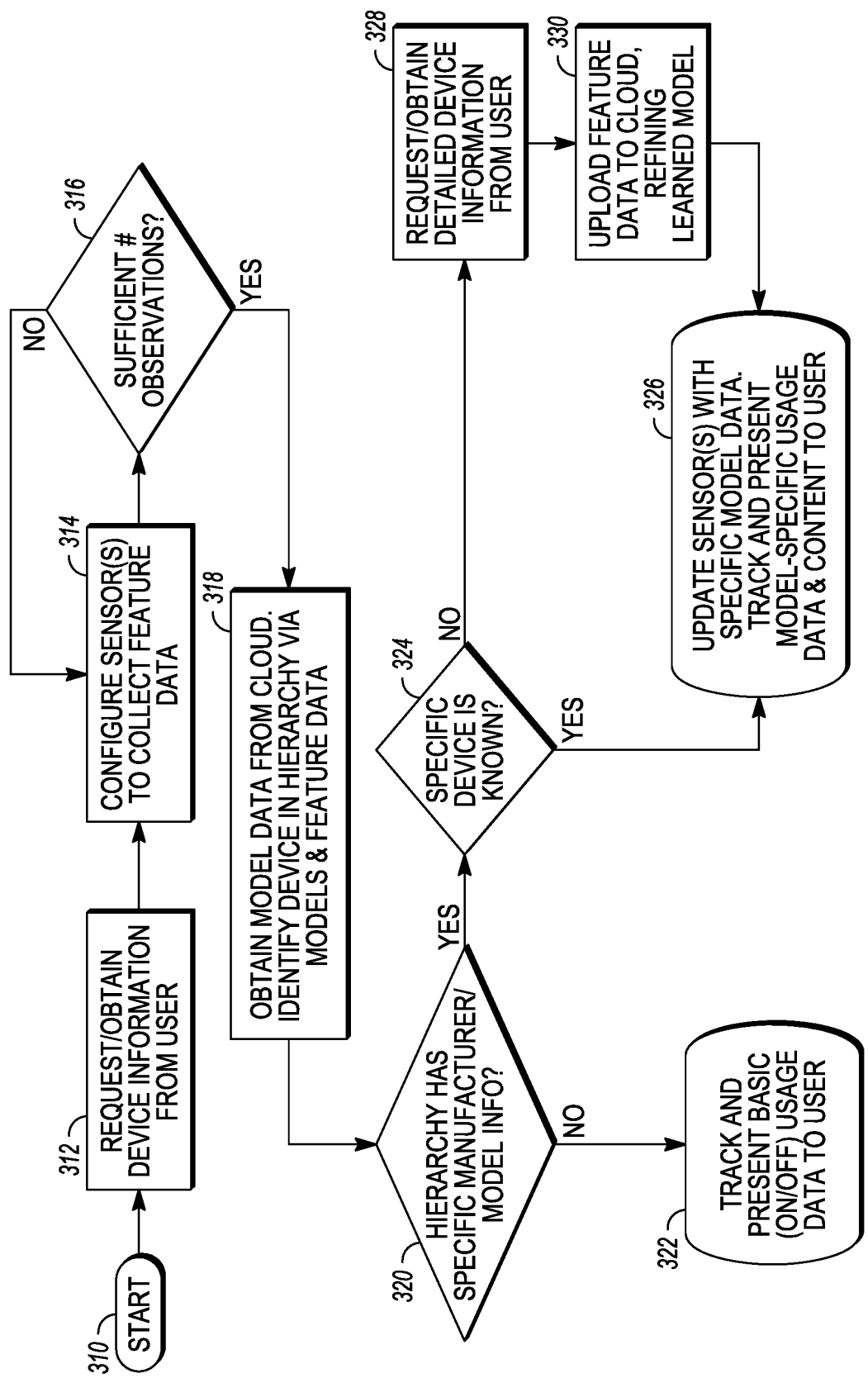
FIG. 3 depicts an illustrative example flowchart showing an example process for identifying a device within a hierarchy model and presenting a user with device relevant information.

FIG. 3 shows an example flowchart showing an example process for identifying a device within a hierarchy model, and presenting a user with device relevant information. In one example, the process starts in step 310. In step 312, device information is obtained from a user. For example, the user takes a picture of the device and provides the picture to the system. In step 314, one or more sensors are configured to collect feature data from the device. After a period of time, the system determines, in step 316, if sufficient observations have been collected. If not, the process returns to step 314. Otherwise, the process proceeds to step 318 where model data is obtained and the device is identified initially within the hierarchical data model. In step 320, the system determines whether the data model has specific information related to the device. If not, the process moves to step 322 where device usage is monitored. Otherwise, the process moves to step 324 where the system determines whether the specific device is known. If the specific device is known, the process, in step 326, updates the sensor and tracks model-specific usage. Otherwise, the user, in step 328, is prompted for further device identification information. In step 330, any collected feature data is uploaded in order to refine the data model.

II. Speech Obfuscation for Audio Sensors

Aspects of the present disclosure provide techniques for determining parameters to create an effective obfuscation transformation and subsequently applying it to an audio sensing device.

In one illustrative embodiment, the method of finding the effective obfuscation transform is to perform a parameter search. For example, a transformation is repeatedly applied to a reference sample of audio with each transformation application using one set of parameter values selected from a plurality of parameter value sets. For each set of parameter values: an amount of privacy provided within the transformed audio relative to a baseline is measured to determine a privacy difference metric; and detection of device operation from the transformed audio relative to a baseline is measured to determine a detection difference metric. Once a privacy difference metric and a detection difference metric for each set of parameter values is determined, the parameter value set providing effective privacy and detection, based on an optimization criteria, is selected. The audio transformation, configured to use the selected parameter value set, is then installed into the audio sensor, where it can be applied to all subsequent audio sensing.

An audio sensor can use audio to determine the states of operation of an observed device. In particular, an audio recording can be made of the environment/room in which a device (e.g., a home appliance) is operating. If the audio sensor has been previously configured (i.e., trained) to recognize the device, then the audio sensor can use the audio recording to detect device operation.

A variety of transformations can be applied to audio; typically, these are classified as temporal or spectral (or a combination). For example, one temporal transformation, temporal shuffling, divides the audio signal into a series of equal-duration frames, and reorders the frames. A spectral transformation may be, for example, application of a band-stop or band-pass filter. Alternatively, the audio data may be transformed into the frequency domain using a fast Fourier transform (FFT), discrete cosine transform (DCT), Hadamard transform or other frequency transformation. These transformations have a number of parameters, such as the duration of the frames, or the characteristics of the filter.

The following is an example of a method to determine an effective obfuscation transformation for audio, in an embodiment. Here, effective means both 1) causing a specified fraction of the speech within the audio to be unintelligible, and 2) limiting the degradation in detecting device operation to a specified amount.

In an embodiment, the method performs a parameter search by repeatedly performing a transformation of reference audio using each set of parameter values from a plurality of parameter value sets. For each parameter value set, an amount of privacy provided within the transformed audio relative to a baseline is measured to determine a privacy difference metric and detection of device operation is measured from the transformed audio relative to a baseline to determine a detection difference metric. The parameter set yielding an acceptable value for both the privacy difference metric and the detection difference metric is then selected.

In an embodiment, measuring the amount of privacy provided . . . relative to a baseline comprises: measuring the speech information that can be detected from the reference audio; measuring the speech information that can be detected from the transformed audio; and computing a privacy difference metric ($M_p$) between the measurements, which measures the amount of speech information detected in the reference audio but not in the transformed audio.

Ideally, the privacy metric is between 0 and 1 ($M_p \in [0,1]$). A value 1 indicates that no intelligible speech information is present in the transformed audio relative to the reference audio. A value 0 indicates that, from the perspective of speech intelligibility, there is no difference between the transformed and reference audio.

In an embodiment, measuring the speech information can comprise: asking a human listener to transcribe the words heard in the audio; asking a human listener the number of distinct speakers; asking a human listener the genders of the speakers that have been heard; asking a human listener if particular words were heard; asking a human listener questions about the overall content of the speech in the audio; and/or extracting text information from an automated speech-to-text engine. For example, a sample of reference audio may be presented to a user and the user may be prompted to identify speech within the audio. Then, for each set of parameter values, the sample of reference audio is transformed and the user is prompted again to identify speech within the transformed audio. That is, the user is repeatedly presented with various transformations of the same audio sample. For any given transformation, the amount of identifiable speech is measured, resulting in a privacy metric for that given transformation. When less speech is identifiable, the privacy metric may be higher and when more speech is identifiable, the privacy metric may be lower.

Of note, the variants of measuring speech information that involve evaluation by a human listener may, in some embodiments, best be realized by using a conventional online crowdsourcing platform, such as Amazon Mechanical Turk or Crowdflower. However, any method of presenting audio to a listener and surveying responses can be used.

In an embodiment, measuring the detection of device operation . . . relative to a baseline comprises: performing detection of device operation based on reference audio, to include measuring the amount of time spent in one or more states that model the device operation; performing detection of device operation based on transformed audio, using the same audio analysis applied to the reference audio; and computing one or more metrics between the two detections by measuring the difference in device detection between the reference and transformed audio. Example metrics include a detection metric $M_d$ and a state transition metric $M_s$.

As with the speech measurement described above, device detection may be evaluated manually or in an automated fashion. For example, a sample of reference audio that includes sounds known to indicate a frequency of use and/or one or more state transitions may be presented to a user. The user need not know what any given sound indicates. Instead, the user may identify occurrences of any given sound. For each set of parameter values, the audio sample is transformed and again presented to the user. In this example, the user is then prompted to indicate whether the user can still identify occurrences of each relevant sound. When the user is able to identify more sound occurrences, the detection metric may be lower and when the user is not able to identify the sound occurrences, the detection metric may be higher.

At a minimum, the device operation is modeled using two states (not operating/idle & operating), but devices may also be represented by a multi-state model. Analysis of an audio recording potentially causes one or more state transitions, which can indicate device operation.

A detection metric $M_d \in [0,1]$ measures the difference between the states visited when analyzing the reference audio as compared to the transformed audio. For the detection metric, only the sequence of states visited is considered; time spent in individual states is ignored. In the simplest embodiment, $M_d=0$ if the state sequence from the transformed audio analysis matches that of the reference audio; $M_d=1$ otherwise. In other embodiments, alternative metrics may be used.

A state transition metric $M_s \in [0,1]$ compares the time spent in each state between the reference audio analysis and the transformed audio analysis. In a typical embodiment, the metric $M_s$ represents the fraction of time (of the length of the audio recording) during which the current state in the baseline audio analysis and in the transformed audio analysis are different. For example, if the audio transformation does not change the state transitions as compared to the baseline audio, then $M_s=0$.

In an embodiment, identifying the parameter set yielding acceptable values comprises: assigning a predetermined weight value to each metric (e.g., weight $w_p$ is applied to metric $M_p$; $w_d$ to $M_d$; etc.); specifying an optimization criteria as $w_p M_p - w_d M_d - w_s M_s$ or, if the state transition metric is omitted, $w_p M_p - w_d M_d$; selecting an effective parameter set that meets the optimization criteria; and configuring the sensor/detector to perform audio transformation using the selected parameter set.

Additional Embodiments (Identifying the Parameter Set)

In certain embodiments, the weights $w_p$, $w_d$, etc. can be determined as a result of characteristics of the environment in which the sensor is operating.

The weight $w_p$ can be determined based on the level of privacy desired for a particular room in which the sensor operates. For example, $w_p$ may be set to a higher value for a room where privacy is more of a concern, such as a bedroom, and to a lower value for a room such as a laundry room. The system can be configured with preset weight values for various rooms of a home. Then, at calibration time, the consumer is asked to specify the room in which the sensor is located and the preset weight $w_p$ for the selected room is configured in the optimization criteria. The weights may be automatically adjusted over time based on an estimate of the amount of speech detected by the sensor. The consumer has the option to override the preset weight with a specific weight value. The value may be entered into the system using a UI element such as a slider.

The weights applying to detection of device operation, $w_d$ and $w_s$, may be determined based on the importance of detection or frequency of use of the device being monitored. In particular, during setup, the consumer can be asked the number of devices that may be monitored in the room in which the sensor is placed. If the number is low (e.g., 1 or 2), then these weights may be set to a lower value than if the number of devices is high. Furthermore, during setup, or during the course of operation, the system can determine which devices are being monitored. The system will have a more detailed state machine model for certain devices than for others; further, the system may be able to provide more detailed information or content to the user for certain devices. Based on these factors, $w_d$ and $w_s$ may be set higher if more detailed detection is beneficial for the consumer. For example, a sensor monitors a washing machine, which has operational states such as fill, wash, rinse, and spin. If the system can track these states, it may present the user with detailed information, such as the expected time until the cycle is complete. In such a case, the weights $w_d$ and $w_s$ may be set higher for this sensor than for sensors monitoring appliances with less specific state machines. The weights may be automatically adjusted over time based on an observed pattern of use of devices being monitored. The consumer has the option to override the automatically determined weight values $w_d$ and $w_s$, such as if the consumer finds the system is not correctly detecting use. The values may be entered into the system using a UI element.

Implementation Results and Benefits

One illustrative practical implementation of an embodiment of an audio sensor for detection of appliance states is described below. In the example, the sensor is trained to recognize a coffee machine's two states (grind & brew). Audio classification is performed using a trained support vector machine (SVM) model.

In experiments with this illustrative implementation of an embodiment, good performance of the detector was found in the presence of additional noise (e.g., speech). Considering potential privacy concerns, an audio transformation step of temporal shuffling was implemented.

Figure 4:
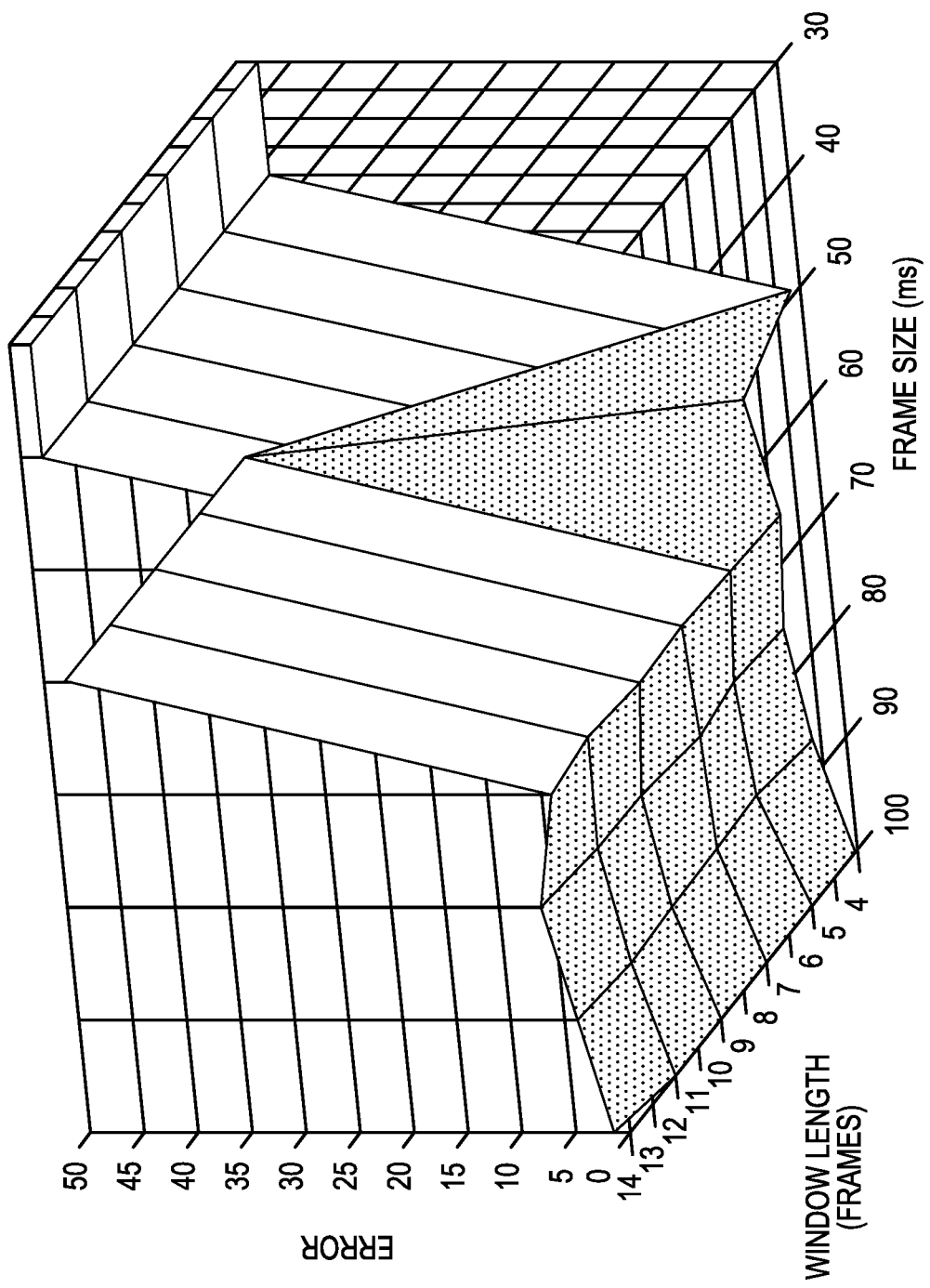
FIG. 4 depicts an illustrative example chart of results showing error metric calculations.

FIG. 4 depicts results of a search in the illustrative implementation of an embodiment. In our experiment, a search was performed across two parameters for the temporal shuffling algorithm (window length & frame size). The "measuring the privacy provided" step was performed only informally with a brief, comparative evaluation. The "measuring the detection of device" step was performed completely, using runs of the detector on the transformed audio. In this case, the error metric was the difference in time measured in device states relative to the baseline, and the frame size parameter was found to have had significant impact on detection. Once an effective parameter value set is selected, the transformation can be installed and utilized to obfuscate subsequent audio recordings.

Implementation of Solution

The method described in this disclosure, to evaluate an appropriate parameter set for obfuscating speech within audio, may be performed repeatedly in an audio sensing system (rather than simply during its design). In fact, it may be desirable to 'recalibrate' the audio transform when the sensing environment or task changes. If the sensor is moved to a new room, for example, it may be desirable to use a different configuration or type of obfuscation to accommodate the acoustic characteristics of the new room. Similarly, if the monitored devices are changed, the obfuscation transformation may be modified to ensure detection is unaffected.

In a typical implementation, the effect of transforming the audio based on the identified parameter set can be demonstrated to a consumer. For example, the audio transformation can be identified using the method described based on audio recorded by the consumer. The transformation can be applied to the audio and played back to the user to demonstrate the speech-obfuscating property of the transformation.

Crowdsourcing Implementation

In embodiments, the popularity and availability of crowdsourcing platforms (such as Amazon Mechanical Turk and CrowdFlower) permit the human-evaluation components of this method to be run repeatedly and at low cost. In particular, the entire procedure can be configured to run automatically. The end user can trigger a recalibration process of the sensor in their home (for example, via a mobile app). The recalibration procedure may prompt the user to operate the device(s) being monitored while an audio recording occurs. This permits evaluation of the detection of device operation. Further, during the audio recording, the user may be prompted to read a few sentences out loud. This permits evaluation of privacy afforded by the audio transformation. Because the speech is of known text, a wider variety of questions may be asked during the step of measuring the speech information. The parameter search method as disclosed herein can be run automatically, with various transformations to the audio automatically applied and evaluated. Upon completion, the end user's sensor can be updated with the audio transformation parameters identified.

Obfuscation Implementation

In some embodiments, temporal shuffling is an audio transformation which may provide good obfuscating properties. In this case, the audio is split into short time segments, called frames, with the frame size parameter indicating the segment duration. Groups of frames are a window (the number of frames specified by the window length parameter). The transformation is applied by taking each successive window and shuffling the order of the frames within the window. A typical frame size is 80 ms and a typical window length is 10 frames. With these parameters, the transformation often will prevent speech from being easily intelligible, while detection of device operation will still be possible.

An example of an alternative transformation is filtering the audio signal. A band-stop filter, for example, attenuates frequencies in a certain frequency range. The filter may be specified using a number of parameters, including pass-band and stop-band frequency values and attenuation. Alternatively, the audio data may be transformed into the frequency domain using a fast Fourier transform (FFT), discrete cosine transform (DCT), Hadamard transform or other frequency transformation.

Obfuscating Speech Via Audio Processing

In a further illustrative embodiment, an audio sensor may continuously monitor a venue including a monitored device and is likely to be within range of conversations. A speech obfuscation technique can be applied to the audio as it is being obtained with the goal to render speech unintelligible, but not affect detection of home device operation. Furthermore, such obfuscation may be demonstrated to a consumer in order to increase trust.

Figure 5:
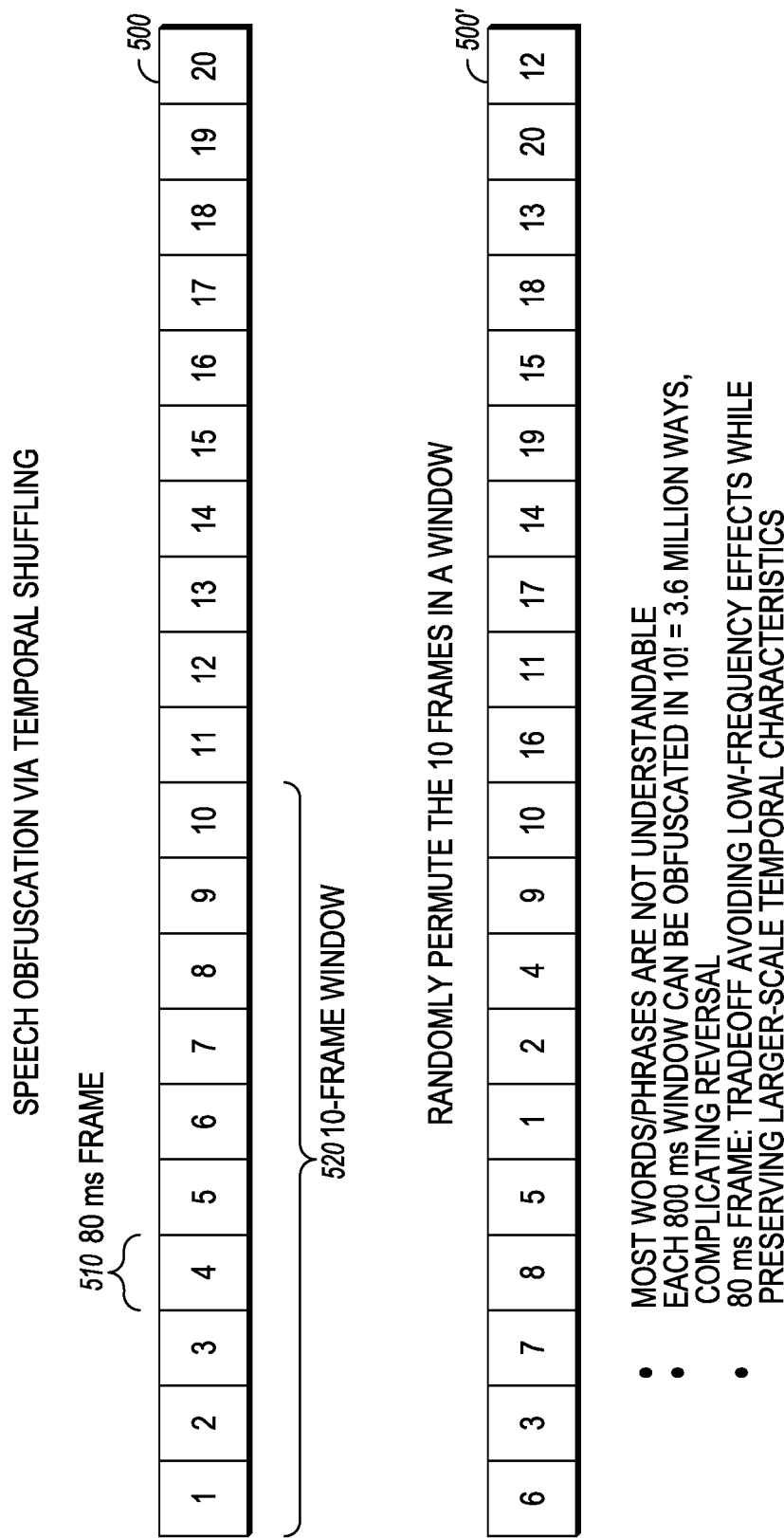
FIG. 5 depicts an illustrative example of temporal shuffling that may be used to obfuscate speech in an audio sample, such as may be captured in the system of FIG. 2.
Figure 6:
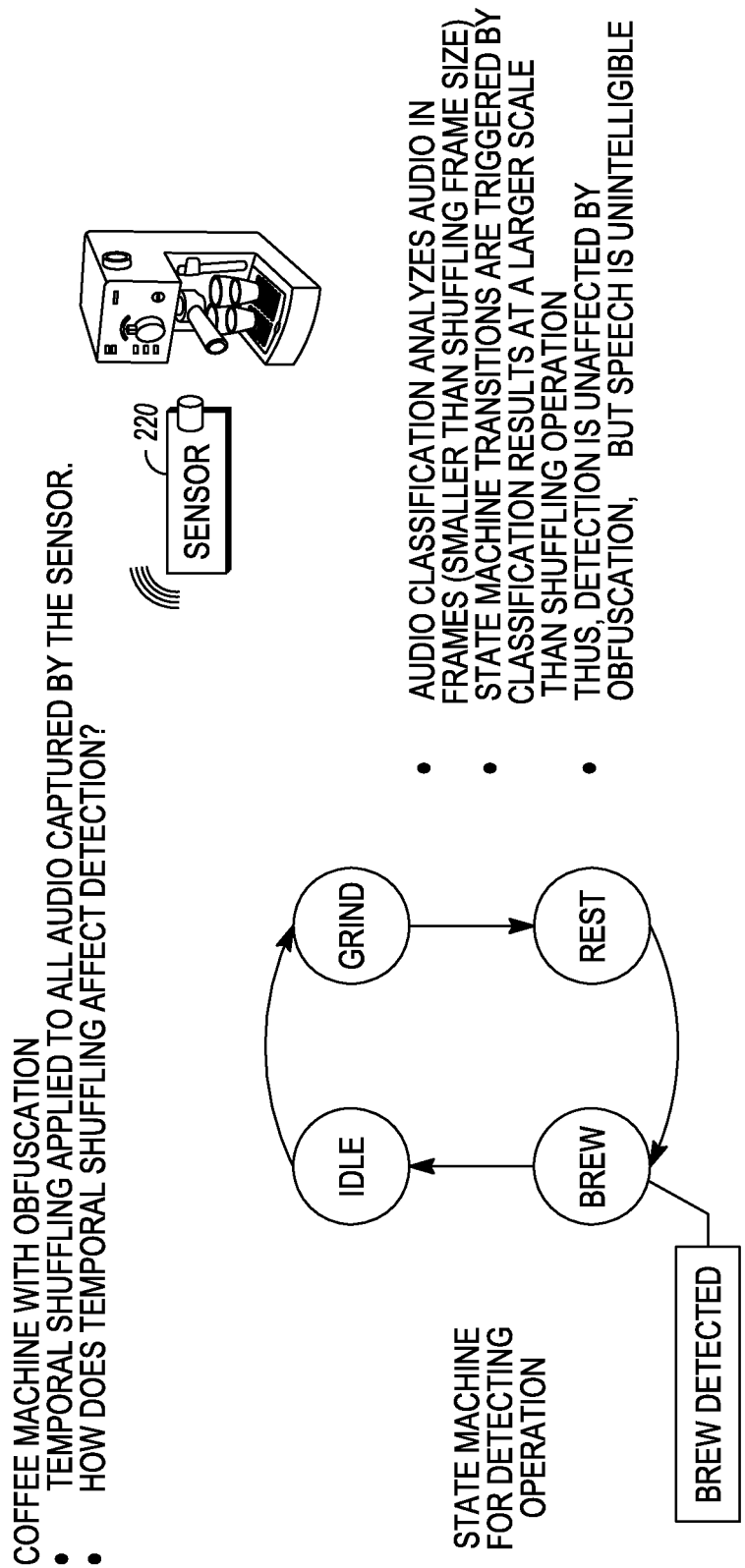
FIG. 6 depicts an illustrative example of device identification and speech obfuscation that may be performed in the system of FIG. 2.

FIG. 5 depicts a further illustrative embodiment of speech obfuscation via temporal shuffling. For example, a captured audio sample 500 is divided into multiple windows 520. Each window 520 is further divided into 80 ms frames 510. In one example, frames 510 within each window 520 are shuffled, resulting in a transformed audio sample 500'. FIG. 6 depicts the impact of speech obfuscation via temporal shuffling on device detection.

Examples of Implementation Details

In an illustrative example of an embodiment, one or more computer processors may be configured to perform steps in accordance with code depicted in FIGS. 7-9D. Specifically, FIG. 7 depicts a MATLAB implementation of a temporal shuffling algorithm. The MATLAB implementation takes as input a WAV audio file, applies temporal shuffling, and outputs the result to a new WAV audio file. For example, the WAV audio file is read and divided into windows and frames. Any fractional frame or partial window may be ignored. Then, for each window, frames within the window are shuffled. The resulting windows with shuffled frames are then written to a new WAV file.

FIGS. 8A-8B depict a Python implementation of automated recording, audio analysis, and prediction of operation of a device. This Python implementation produces the prediction of device states (e.g., idle, grind, & brew) based on analysis of the recorded audio.

FIGS. 9A-9D depict a Javascript implementation of detection of coffee machine operation. In one example, coffee machine has four states which are detected: idle, grind, rest & brew. The processParamsAndFile function receives a file containing the predictions of idle, grind & brew based on analysis of the recorded audio (e.g., as a result of the Python implementation of FIGS. 8A-8B). In turn, the processSamp function analyzes each received prediction and validates whether each state was accurately predicted. If a prediction is accurate, the processSamp returns with the next appropriate state. Otherwise, the processSamp function logs an error event.

While the examples have been described above in connection with specific devices, apparatus, systems, and/or methods, it is to be clearly understood that this description is made only by way of example and not as limitation. Particular embodiments, for example, may be implemented in a non-transitory computer-readable storage medium for use by or in connection with an instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented, and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. Accordingly, the specification and figures are to be regarded in an illustrative rather than a restrictive sense, and all such modifications are intended to be included within the scope of the claims. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method, comprising:
obtaining a first user input identifying a device;
collecting from at least one ambient sensor, one or more feature data sets related to the device, wherein collecting one or more feature data sets comprises:
capturing, via an audio sensor, audio data from a space in which the device is located, the captured audio data including audio data generated by the device;
analyzing the captured audio data to detect a frequency of use of the device;
analyzing the captured audio data to generate the one or more feature data sets, wherein the analyzing comprises: selecting an effective transformation; and transforming the captured audio data based on the selected transformation; and
comparing the one or more feature data sets to reference feature data using a statistical model to identify stage of operation of the device;
identifying a set of device models based on the first user input, the detected frequency of use of the device, and the identified stage of operation of the device, wherein the device being represented by at least one device model of the set of device models;
requesting, based on the set of device models, a second user input;
retrieving, based on the second user input, information about the device; and
presenting the retrieved information to the user.

2. The method of claim 1, wherein the first user input includes an image of the device.

3. The method of claim 1, wherein the selected transformation is one of a spectral transformation, a temporal transformation or a combination spectral and temporal transformation.

4. The method of claim 1, wherein the selecting comprises:
for each of a plurality of sets of parameter values:
applying, using the respective set of parameter values, the transformation to a reference audio data;
measuring a privacy difference metric, the privacy difference metric indicating an ability to detect speech in the transformed reference audio data; and
measuring a detection difference metric, the detection difference metric indicating an ability to detect device operation; and
identifying an effective set of parameter values such that the set of parameter values result in a privacy difference metric and a detection difference metric that meet an optimization criteria.

5. The method of claim 4, wherein:
measuring the privacy difference metric comprises:
measuring an amount of detected speech in the reference audio data;
measuring an amount of detected speech in the transformed reference audio data; and
computing the privacy difference metric as an amount of speech detected in the reference audio data but not detected in the transformed reference audio data; and
measuring the detection difference metric comprises:
performing detection of device operation based on the reference audio data;
performing detection of device operation based on the transformed reference audio data; and
computing the detection difference metric as a difference in device operation detection between the reference audio data and the transformed reference audio data.

6. The method of claim 4, wherein the selecting further comprises assigning, for each of the plurality of sets of parameter values, a first predetermined weight to the privacy difference metric and a second predetermined weight to the detection difference metric.

7. A system comprising:
at least one audio sensor; and
a processor in communication with the at least one audio sensor, the processor programmed to implement functions, including functions to:
obtain a first user input identifying a device;
collect from at least one ambient sensor, one or more feature data sets related to the device, wherein the function to collect the one or more feature data sets comprises functions to:
capture, via the audio sensor, audio data from a space in which the device is located, the captured audio data including audio data generated by the device;
analyze the captured audio data to detect a frequency of use of the device;
analyze the captured audio data to generate the one or more feature data, wherein the function to analyze the captured audio data comprises functions to:
select an effective transformation; and transform the captured audio data based on the selected transformation; and
compare the one or more feature data sets to reference feature data using a statistical model to identify stage of operation of the device;
identify a set of device models based on the first user input, the detected frequency of use of the device, and the identified stage of operation of the device, wherein the device being represented by at least one device model of the set of device models;
request, based on the set of device models, a second user input;
retrieve, based on the second user input, information about the device; and
present the retrieved information to the user.

8. The system of claim 7, wherein the selected transformation is one of a spectral transformation, a temporal transformation or a combination spectral and temporal transformation.

9. The system of claim 7, wherein the function to select the effective transformation comprises functions to:
for each of a plurality of sets of parameter values:
apply, using the respective set of parameter values, the transformation to a reference audio data;
measure a privacy difference metric, the privacy difference metric indicating an ability to detect speech in the transformed reference audio data; and
measure a detection difference metric, the detection difference metric indicating an ability to detect device operation; and
identify an effective set of parameter values such that the identified set of parameter values result in a privacy difference metric and a detection difference metric that meet an optimization criteria.

10. The system of claim 9, wherein:
the function to measure the privacy difference metric comprises functions to:
measure an amount of detected speech in the reference audio data;
measure an amount of detected speech in the transformed reference audio data; and
compute the privacy difference metric as an amount of speech detected in the reference audio data but not detected in the transformed reference audio data; and
the function to measure the detection difference metric comprises functions to:
perform detection of device operation based on the reference audio data;
perform detection of device operation based on the transformed reference audio data; and
compute the detection difference metric as a difference in device operation detection between the reference audio data and the transformed reference audio data.

11. The system of claim 9, wherein the function to select the effective transformation further comprises a function to assign, for each of the plurality of sets of parameter values, a first predetermined weight to the privacy difference metric and a second predetermined weight to the detection difference metric.

12. A non-transitory computer readable medium containing computer instructions, the instructions causing a computer to:
obtain a first user input identifying a device;
collect one or more feature data sets related to the device, wherein collecting the one or more feature data sets comprises:
capturing, via the audio sensor, audio data from a space in which the device is located, the captured audio data including audio data generated by the device;
analyzing the captured audio data to detect a frequency of use of the device;
analyzing the captured audio data to generate the one or more feature data sets, wherein analyzing the captured audio data comprises: selecting an effective transformation; and transforming, based on the selected transformation, the captured audio data; and
comparing the one or more feature data sets to reference feature data using a statistical model to identify stage of operation of the device;
identify a set of device models based on the first user input, the detected frequency of use of the device, and the identified stage of operation of the device, wherein the device being represented by at least one device model of the set of device models;
retrieve, based on the second user input, information about the device; and
present the retrieved information to the user.

13. The non-transitory computer readable medium of claim 12, wherein the selected transformation is one of a spectral transformation, a temporal transformation or a combination spectral and temporal transformation.

14. The non-transitory computer readable medium of claim 12, wherein the instructions further cause the computer to:
for each of a plurality of sets of parameter values:
apply, using the respective set of parameter values, the transformation to a reference audio data;
measure a privacy difference metric, the privacy difference metric indicating an ability to detect speech in the transformed reference audio data; and
measure a detection difference metric, the detection difference metric indicating an ability to detect device operation; and
identify an effective set of parameter values such that the identified set of parameter values result in a privacy difference metric and a detection difference metric that meet an optimization criteria.

15. The non-transitory computer readable medium of claim 14, wherein the instructions further cause the computer to:
measure an amount of detected speech in the reference audio data;
measure an amount of detected speech in the transformed reference audio data;
compute the privacy difference metric as an amount of speech detected in the reference audio data but not detected in the transformed reference audio data;
perform detection of device operation based on the reference audio data;
perform detection of device operation based on the transformed reference audio data; and
compute the detection difference metric as a difference in device operation detection between the reference audio data and the transformed reference audio data.

16. The non-transitory computer readable medium of claim 14, wherein the instructions further cause the computer to assign, for each of the plurality of sets of parameter values, a first predetermined weight to the privacy difference metric and a second predetermined weight to the detection difference metric.

* * * * *